(No Model.)
W. BECRAFT.
DEVICE FOR CATCHING AND HOLDING ANIMALS.
No. 416,046. Patented Nov. 26, 1889.
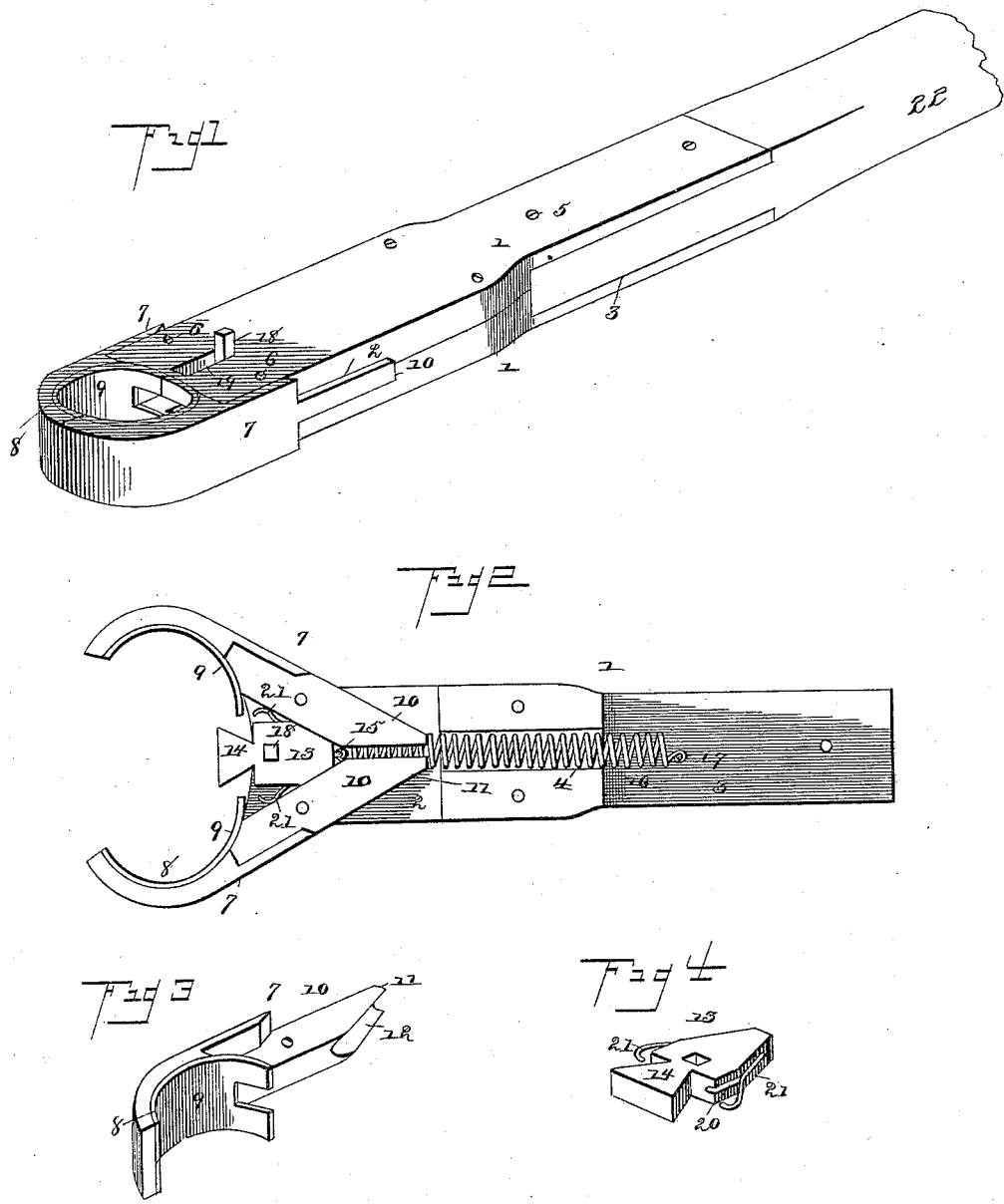
Witnesses:
John Smise
Inventor
William Becraft
By his Attorneys,
C A Snow & Co.

UNITED STATES PATENT OFFICE.

WILLIAM BECRAFT, OF BEAUMONT, KANSAS.

DEVICE FOR CATCHING AND HOLDING ANIMALS.

SPECIFICATION forming part of Letters Patent No. 416,046, dated November 26, 1889.

Application filed July 11, 1889. Serial No. 317,132. (No model.)

*To all whom it may concern:*

Be it known that I, WILLIAM BECRAFT, a citizen of the United States, residing at Beaumont, in the county of Butler and State of Kansas, have invented a new and useful Device for Catching and Holding Hogs and other Animals, of which the following is a specification.

This invention has relation to a device for catching and holding hogs and other animals; and among the objects in view are to provide a device the jaws of which are capable of being set in an open position, and which are automatically closed to embrace the legs of a hog or other animal when the device comes in contact therewith.

A further object of the invention is to produce such a device in a simple and economical manner.

With these general objects in view the invention consists in two opposite plates suitably spaced and clamped together, having located therein between at one end a handle, and at its opposite end opposite pivoted leg-embracing jaws, and an actuating-cam movably mounted between the jaws, and a spring for operating the cam, all as will hereinafter appear, and be particularly pointed out in the claims.

Referring to the drawings, Figure 1 is a perspective of a hog-catcher constructed in accordance with my invention. Fig. 2 is a view in plan, one of the plates or sections being removed and exposing the interior mechanism. Fig. 3 is a perspective in detail of one of the jaws; Fig. 4, a similar view of the spring-cam.

Like numerals of reference indicate like parts in all the figures of the drawings.

1 1 represent opposite, and preferably cast-metal, plates or sections, the meeting faces of which are oppositely recessed, as at 2 and 3, and are further provided with a central intermediate recess 4, longitudinally disposed with relation to the plates and communicating with the recesses 3 and 2. Screws or bolts 5 connect the plates 1, and the latter are provided with opposite transverse bearing-pins 6, which pass through the recess 2. Upon the pins 6 are mounted opposite jaws 7, the forward ends of which are semicircular, as at 8, and are provided with a lining of rubber or other soft material 9, so as not to injure or bruise the leg of the animal gripped thereby. Each of the jaws 7 terminates in a reduced shank 10, cut away at its rear end, as at 11, and grooved, as at 12.

13 represents the sliding cam, provided with an abutting end 14 at its forward end and terminating at its rear end in an eye 15, to which is connected a coiled spring 16, located in the recess 4, and having its opposite end connected at 17 with the interior face of one of the sections 1. A transverse pin or bar 18 is passed through the cam 13, and the opposite ends of the same project through longitudinal guide-slots 19, formed in the forward ends of sections 1, intermediate the bearing-pins 6. The opposite edges of the cam 13 are provided with longitudinal grooves 20, each of which is provided with a spring 21, the free end of which extends outwardly. A handle 2 is secured in the recessed portion 3 of the plates by screws or bolts 5.

To set the device, the cam 13 is moved forward in its guiding-slot 19 by means of the hand of the operator pressing upon the opposite terminals of the transverse bar 18 until the springs 21 arrive at a point beyond the pivots or bearing-pins 6, and inasmuch as the small springs 21 ride against the adjacent edges of the shanks 10 the jaws are thrown open, which opening of the jaws is permissible by reason of their lower ends being cut away and grooved, the groove receiving the coiled spring 16. When in this position the abutting end 14 of the cam is projected beyond the forward ends of the plates 1, and any object coming in contact with the same—as, for instance, an animal's leg—forces the cam inwardly and beyond the points of pivot of the jaws, when the coiled spring 16 draws the cam back to its original position, and throws the jaws to a closed position and against opening, except by sliding the cam forward, as before described.

Having described my invention, what I claim is—

1. In a device of the class described, the combination, with opposite sections having their adjacent faces recessed and each slotted near its forward end, of opposite jaws pivoted in the recess and with a cam mounted between the jaws, and having operating-lugs projecting through the slots, and a retracting-spring connected to the cam and to one of the sections, substantially as specified.

2. In a device of the class described, the combination, with the opposite sections and opposite independently-pivoted jaws terminating in rear of their pivots in shanks, of a sliding cam mounted between the shanks, and a retracting-spring for operating the cam, substantially as specified.

3. The combination, with the plates 1, having their opposite faces recessed, as 2, 3, and 4, and provided with bearing-pins 6 in the recess 2, and with an intermediate longitudinal slot 19, of the jaws 7, pivoted upon the bearing-pins and terminating at their forward ends in semicircular gripping-jaws 8, and at their rear ends in reduced shanks 10, cut away as at 11, and grooved as at 12, the cam 13, mounted intermediate the jaws in the recess 2, and having the spring 16 connected to its rear end, said spring having its opposite end connected, as at 17, to one of the plates, the cross-bar 18, extending through the cam 13 and through the opposite slots 19, formed in the plates 1, and the abutting head 14, formed at the opposite end of the cam 13, substantially as specified.

4. The combination, with the plates 1, of the oppositely intermediate pivoted jaws 7, terminating in shanks cut away, as at 10, and grooved, as at 12, and of the intermediately-located and jaw-operating cam 13, having an abutting end 14, and its sides grooved, as at 20, and provided with springs 21, operating against the edges of the jaws, substantially as specified.

5. The combination, with the handle, of the opposite independently-pivoted curved jaws extended in rear of their pivots to form shanks, a jaw-spreading cam fitting and mounted for movement between the shanks and adapted to be projected in front of their pivots, and a retracting-spring connected to the cam and adapted to normally maintain the cam in rear of said pivots, substantially as specified.

6. The combination, with the plates 1, of the oppositely-intermediate pivoted jaws 7, and of the intermediately-located and jaw-operating cam 13, having springs 21, operating against the edges of the jaws, substantially as specified.

In testimony that I claim the foregoing as my own I have hereto affixed my signature in presence of two witnesses.

WILLIAM BECRAFT.

Witnesses:
JOHN W. SEELEY,
HIRAM S. LUDWICK.